Oct. 29, 1946.    J. W. KINNUCAN    2,410,167
ACCESSORY MECHANISM AND DRIVE FOR AIRCRAFT ENGINES
Filed March 10, 1942    5 Sheets-Sheet 1

INVENTOR.
James W. Kinnucan
BY
ATTORNEY.

Patented Oct. 29, 1946

2,410,167

UNITED STATES PATENT OFFICE 2,410,167

ACCESSORY MECHANISM AND DRIVE FOR AIRCRAFT ENGINES

James W. Kinnucan, Detroit, Mich., assignor to Continental Aviation and Engineering Corporation, Detroit, Mich., a corporation of Virginia Application March 10, 1942, Serial No. 434,137

7 Claims. (Cl. 123—195)

My invention relates to internal combustion engines and more particularly to the assembly therewith, of the accessories and the accessory driving mechanisms. More especially the present invention is applicable to a V-type in line engine constructed to present a minimum frontal area and having a plurality of accessories compactly located within the projected outside diameter of the engine, said accessories cooperating with the engine to provide an improved power plant design.

An object of my present invention is to provide an improved engine and accessory assembly by constructing the accessory driving mechanism and locating the accessories near the forward end of the engine and to position same for the most part in alignment with the projected segment of space between the engine cylinders.

A further object of the present invention is to construct an improved accessory and engine assembly by providing an improved gearing arrangement which facilitates a compact accessory assembly.

A still further object of my present invention is to construct an improved accessory gear case containing accessory gearing assembled in operative relation within a minimum of space and providing a well balanced assembly, all of which is confined within the frontal projection of the engine and arranged substantially symmetrical with respect to the nose of the engine which supports a propeller shaft extending coaxially with the engine center axis.

For a more detailed understanding of my invention, reference may be had to the accompanying drawings illustrating a preferred embodiment thereof and in which:

Fig. 6 is a detail view of a generator and lubricating pump drive associated with and driven by said accessory driving mechanism.

Figure 1:
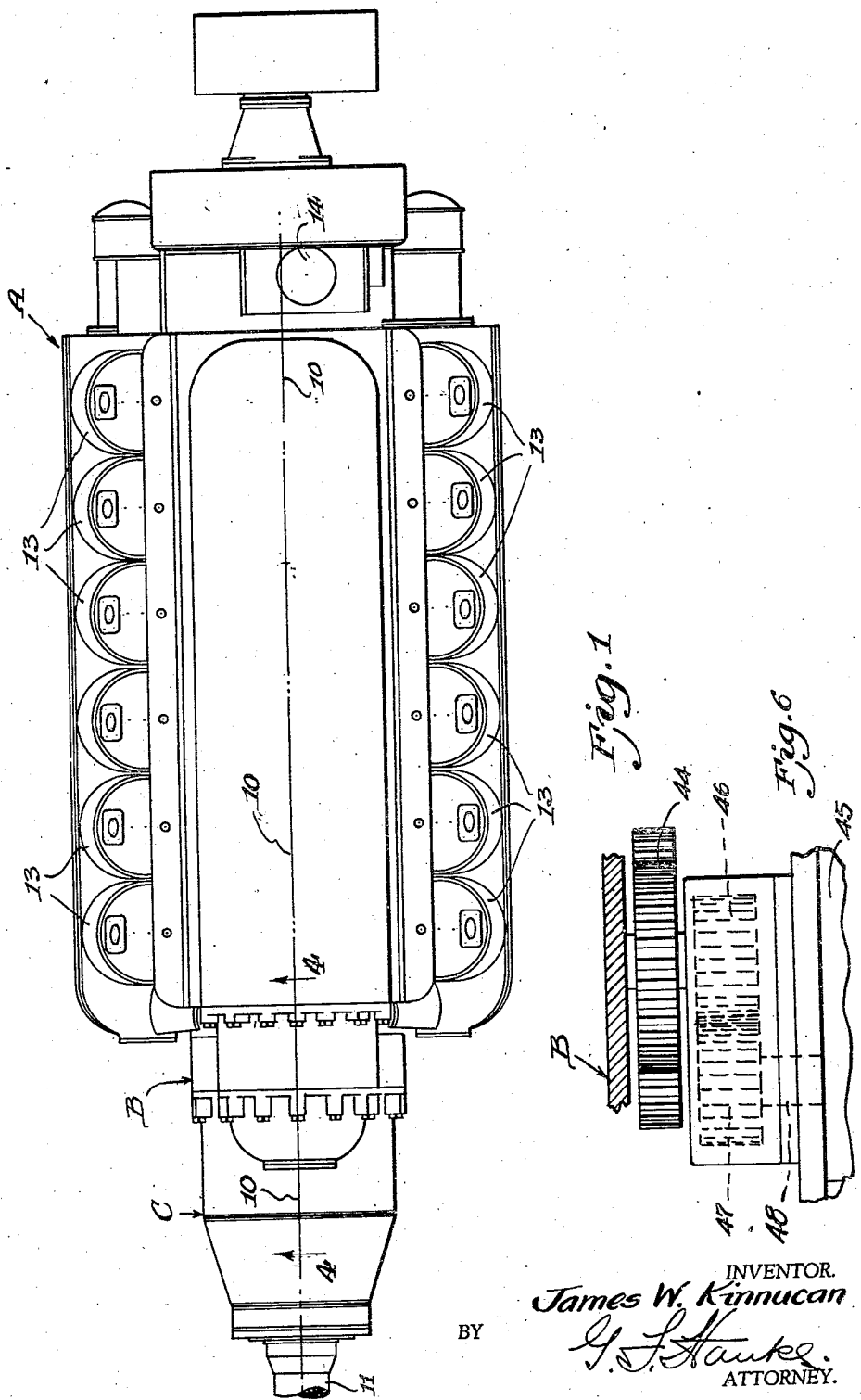
Fig. 1 is a plan view of an engine constructed in accordance with my invention.
Figure 2:
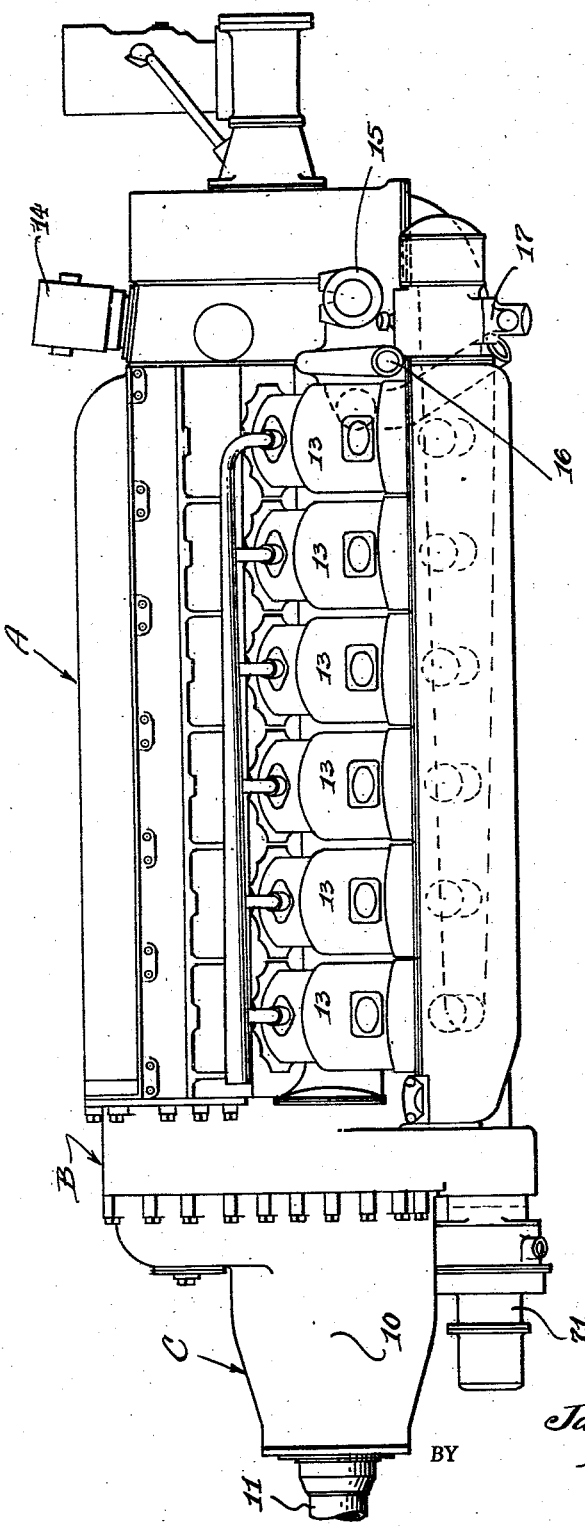
Fig. 2 is a side elevation thereof.

In Figs. 1 and 2 I have illustrated my improved engine construction in combination with the accessory gear case, and the engine as a whole is designated by the reference character A. B designates the gear case, and C designates the reduction gear housing which is bolted or otherwise secured to the gear case B and constructed to be positioned coaxially with respect to the center longitudinal engine axis 10. The propeller shaft 11 is supported by the casing C and driven by suitable gearing from the engine crankshaft 12.

The engine A is preferably constructed as a V-type engine having two banks of aligned cylinders 13 constructed to lie in planes respectively inclined at an angle to each other. The engine is provided at the rear with the conventional magneto 14, vacuum pump 15, coolant pump 16, and the fuel pump 17. The engine is of the conventional overhead valve type, and is provided with valve shafts 18 and 18a respectively extending longitudinally of each bank of engine cylinders and operable to actuate the engine valves in a conventional manner.

Figure 4:
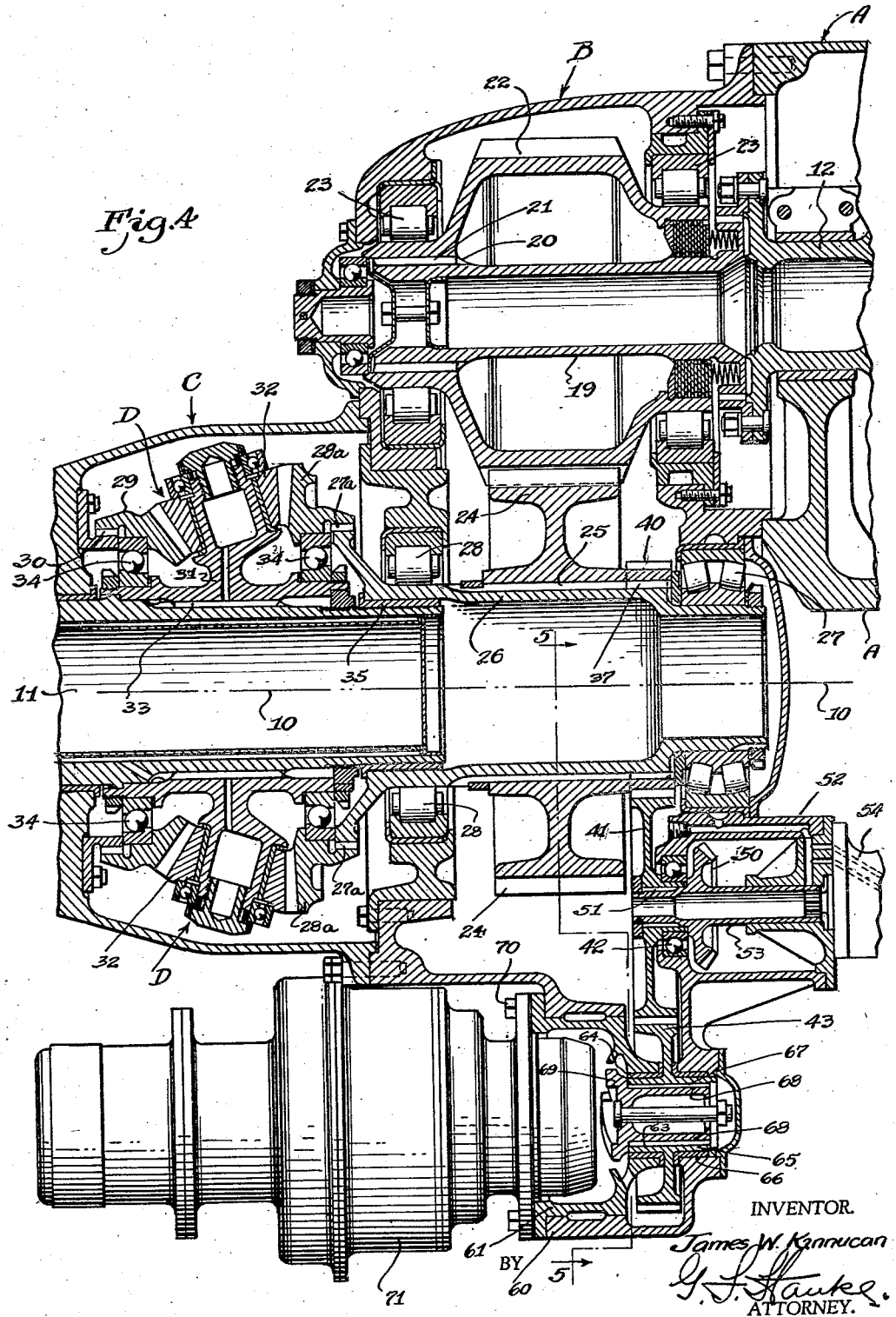
Fig. 4 is an enlarged longitudinal sectional view showing the accessory driving mechanism and taken substantially on the line 4—4 of Fig. 1.

Referring more particularly to Fig. 4, it will be noted that the engine crankshaft 12 carries an extension 19 which is supported within the gear case B and carries external splines 20 arranged to engage the internal splines 21 of the crankshaft gear 22. This crankshaft gear 22 is supported in bearings 23 carried by the gear case B, and meshes with a driven gear 24 which is splined or keyed as at 25 to a driven shaft 26, said shaft 26 being rotatably supported in the rear and forward bearings 27 and 28 respectively, which bearings are carried by the gear case B.

The driven shaft 26 is constructed to drive the propeller shaft 11 through a reduction gear mechanism D. The details of the reduction gear mechanism, as herein illustrated is particularly described and claimed in my prior Patent No. 2,253,977, dated August 26, 1941. However, it will be noted that the shaft 26 is splined as at 27a to the driving ring gear 28a of the reduction mechanism. Another ring gear 29 of different pitch diameter is fixed to the reduction gear case C as at 30, and the carrier 31 is driven at a reduced speed by means of the operative connection of the spindle gears 32 with these ring gears 28 and 29. The carrier 31 is splined as at 33 with the propeller shaft 11 and is supported in bearings 34, said propeller shaft being supported in any suitable manner by the reduction gear casing and the inner end thereof is supported in a bearing 35 carried internally of the shaft 26.

The shaft 26 has external splined teeth which project beyond the rear face of gear 24 as at 37, and a spur gear 40 is carried on these projected splines of shaft 26, and is driven thereby. It will be noted that the gear 40 lies intermediate the gear 24 and the bearing 27 which supports the inner end of shaft 26. The gear 40 is the driving gear of an accessory gear train as is hereinafter described in more detail.

Figure 3:
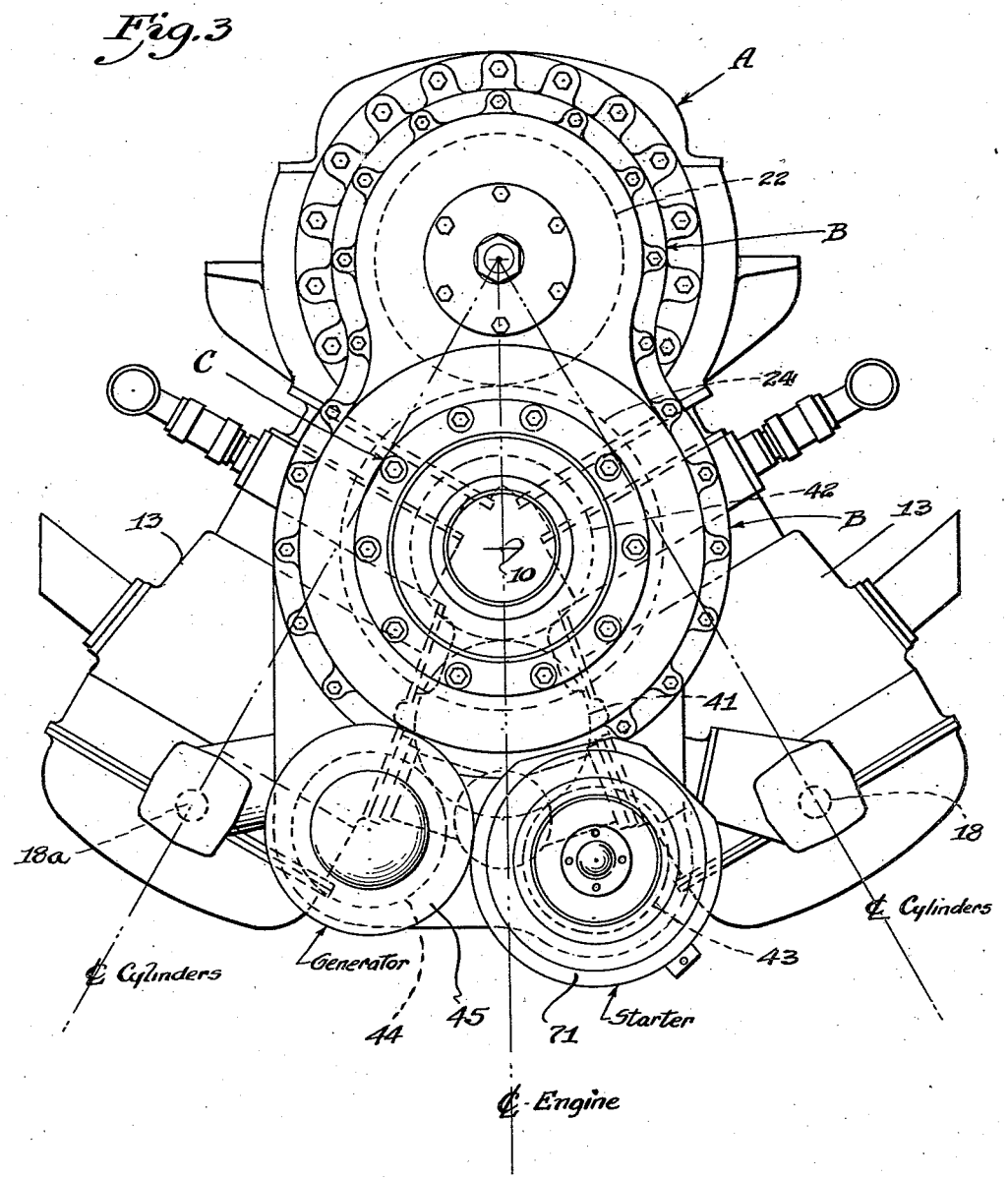
Fig. 3 is a front end view of the engine.

An intermediate driven gear 41 is preferably driven at a one to one ratio with respect to gear 40, and is supported by a bearing 42 carried by the gear case B. The gear 41 meshes with a stator gear 43 and with an intermediate gear 44 (see Fig. 5), said last mentioned gear 44 being suitably connected to drive generator 45. It will be noted, however, that the gears 40, 41, 43 and 44 lie in a common plane, and are all located substantially within the segmental V-shaped space between the engine cylinders as clearly illustrated in Figs. 3 and 5.

Referring more particularly to Fig. 6 it will be noted that gear 44 drives the coaxial driving pump gear 46, which in turn meshes with the driven pump gear 47 mounted on the generator shaft 48. This gear pump which is constructed of gears 46 and 47 is provided for pumping oil accumulations from the lower-most portions of the cylinder head structures when the engine is arranged in a form of an inverted V as herein illustrated. The gear 44 is preferably mounted directly on the generator shaft 48.

Figure 5:
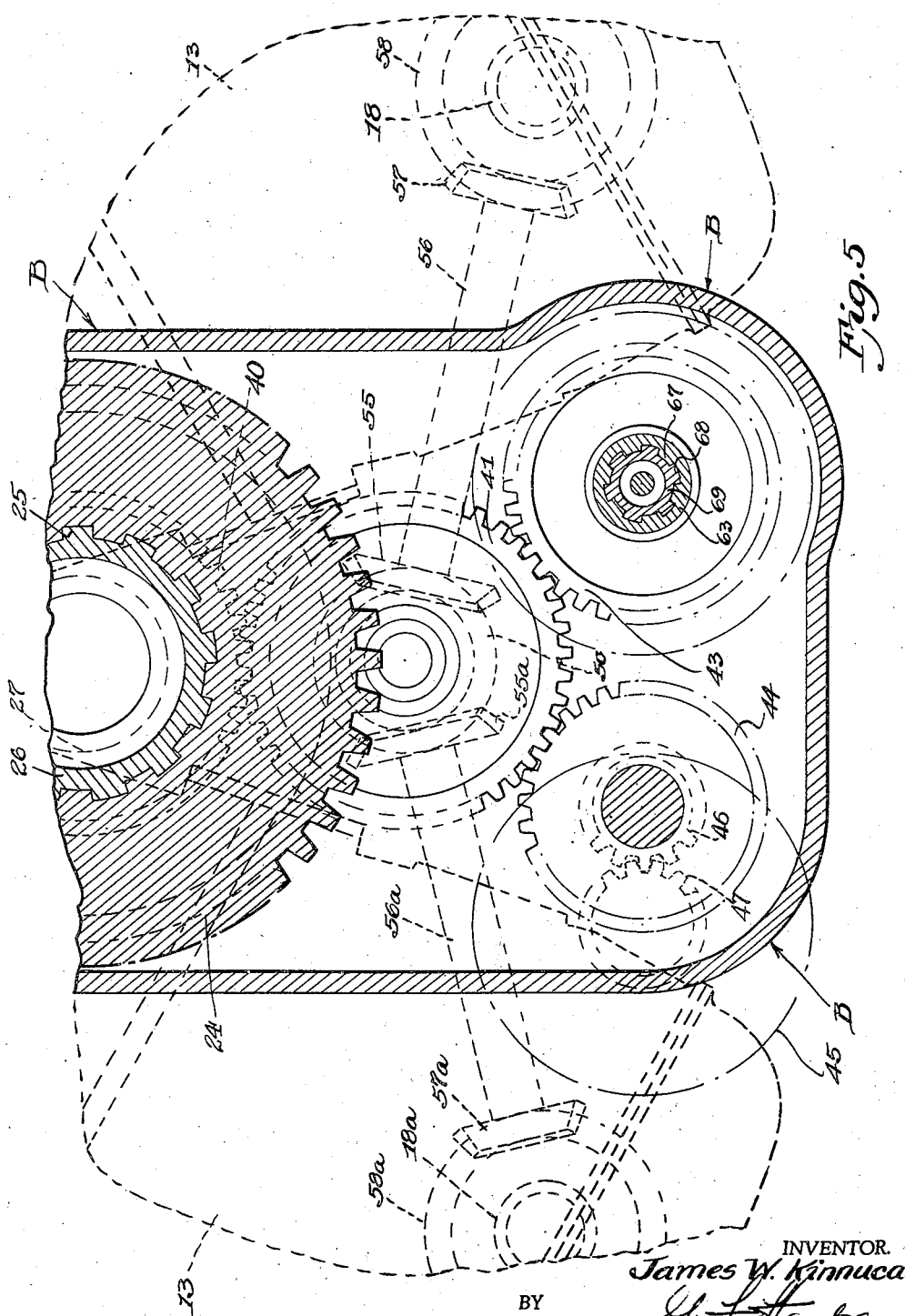
Fig. 5 is a transverse sectional view of the accessory gearing taken substantially on the line 5—5 of Fig. 4.

The engine valve mechanisms for both banks of engine cylinders are driven from a common gear. This common driving gear comprises a bevelled gear 50, Fig. 4, which is splined or otherwise secured to gear 41 as at 51, and is housed within a gear box 52. If desired, the gear 50 may be provided with a hub 53 extending rearwardly through the gear box 52. If desired, the gear 50 may be provided with a hub 53 extending rearwardly through the gear box 52 and operatively connected to drive an engine governor 54. The driven bevelled gears 55 and 55a, Fig. 5, are housed within the gear box 52 and both mesh with the common gear 50. These bevelled gears 55 and 55a are secured to the shafts 56 and 56a respectively secured to the camshaft bevelled driving gears 57 and 57a respectively. The camshafts 18 and 18a are provided with suitable bevelled driven gears 58 and 58a drivingly connected with the bevelled gears 57 and 57a. The camshafts 18 and 18a are, of course, driven at twice crankshaft speed, as is customary with an engine operated on the four-stroke cycle, by suitably selecting gears of a predetermined pitch diameter.

Referring more particularly to Fig. 4 it will be noted that I have provided a novel arrangement for particularly supporting the starter gear and associated mechanisms. The gear case B is provided with a starter gear and starter jaw housing portion 60, which is bored or machined to support an adapter 61 concentric with respect to the axes of the starter gear and its support. The housing 60 carries a bearing 64 for rotatably supporting the forwardly projecting hub 63 of the starter gear 43. The rearwardly projecting hub 65 of the starter gear is preferably supported in the fixed bearing 66 carried by the gear case B. The starter gear 43 is provided with internal splines 67 meshing with the external splines 68 of the starter jaw 69.

It will be noted that the adapter portion, supporting the casing 60, is constructed with a diameter slightly in excess of the diameter of the starter gear 43, and thus, when it is desired to remove the starter gear and/or starter jaw clutch for servicing, same can be removed as a unit by first removing the bolts 70 which serve to secure the starter 71 to the gear case B. Said starter is provided with a conventional starter driving clutch. The removal of bolts 70 permits the starter to be removed and also disconnects the adapter 61 from the gear case. The adapter may then be withdrawn and the bearing 61 which is fixed thereto, and this carries with it the starter jaw clutch 69 and starter gear 43. It will thus be seen that the adapter bearing, the jaw clutch 69, and starter gear 43 form a unitary assembly which is removably mounted within the gear case.

The gear case thus is constructed to carry supporting means compactly arranged which support the starter 71 and generator 45 within the projected segmental space between the engine cylinders, and said starter and generator are mounted for operation about axes extending substantially parallel to the crankshaft and propeller axes. It will be also noted that the starter and generator are assembled in that space immediately below the reduction gear housing C and lie entirely within the projected circle which is circumscribed about the engine with its center coinciding with the center longitudinal axis 10 of the engine, the propeller shaft 11 being also coaxially supported with respect to the center axis 10 of the engine.

It will thus be noted that I have provided an engine and accessory assembly which is of minimum diameter. Furthermore the accessory driving mechanism comprises a minimum number of gears, all of which are compactly arranged and cooperatively assembled within a minimum of space. This present engine assembly and accessory driving mechanism are preferably nested substantially symmetrical with respect to the center axis of the engine and with the reduction drive housing. The accessory driving gear mechanisms consists of a train of gears lying substantially in a common plane, which extends transversely of the engine and substantially normal to the center longitudinal axis of said engine, the plane of these gears extending intermediate the propeller driving gear 24 and the bearing 27 which supports the propeller drive shaft 26, the driving gear of this train being driven by the shaft 26 as described above.

Although I have illustrated but one form of my invention, and have described in detail but a single application thereof, it will be apparent to those skilled in the art to which my invention pertains, that various modifications and changes may be made therein without departing from the spirit of my invention or from the scope of the appended claims.

I claim:

1. In an accessory drive assembly for an aircraft engine having a crankshaft, a starter having a starter driving clutch, an accessory drive means including a gear case and a gear train drivingly connected with said crankshaft and including a starter gear, a starter jaw clutch unit secured to said starter gear and engageable with said starter driving clutch, and an adapter removably secured to said gear case and provided with bearing means for supporting said starter gear.

2. In an accessory drive assembly for an aircraft engine having a crankshaft, a starter having a starter driving clutch, an accessory drive means including a gear case and a gear train drivingly connected with said crankshaft and including a starter gear, a starter jaw clutch unit secured to said starter gear and engageable with said starter driving clutch, said gear case having an opening in the forward face thereof of a diameter greater than the starter gear diameter, and an adapter removably secured to said gear case and provided with a hub portion fitted into said opening and having an extension carrying a starter gear bearing.

3. In an accessory drive assembly for an aircraft engine having a crankshaft, a starter having a starter driving clutch, an accessory drive means including a gear case and a gear train drivingly connected with said crankshaft and including a starter gear, a starter jaw clutch unit secured to said starter gear and engageable with said starter driving clutch, said gear case having an opening in the forward face thereof of a diameter greater than the starter gear diameter, and an adapter removably secured to said gear case and provided with a hub portion fitted into said opening and having an extension carrying a starter gear bearing, said adapter, starter gear and starter jaw clutch removable as a unitary assembly from said gear case.

4. In a power transmission assembly for an aircraft engine comprising an engine of the V-type having a crankcase, a crankshaft, and a plurality of aligned cylinders, a separate gear case secured to the forward end of said engine crankcase, a driving gear housed within the said gear case and driven by said crankshaft, an accessory drive mechanism driven by said crankshaft driving gear and substantially housed within said gear case, and a plurality of accessory units comprising a generator and a starter supported by said gear case and operatively connected with said accessory drive mechanism, a reduction gear assembly including a casing offset with respect to said crankshaft and secured to the gear case and projecting forwardly of the engine substantially coaxial with respect to the center longitudinal axis of the engine, which axis is substantially equidistant from the outer extremities of the crankcase and cylinder heads, said accessory units supported forwardly of the gear case and positioned substantially within the axial projection of the segmental space lying intermediate the V-arranged engine cylinders and adjacent to said reduction gear casing.

5. In a power transmission assembly for an aircraft engine comprising an engine of the V-type having a crankcase, a crankshaft and a plurality of aligned cylinders, a separate gear case secured to the forward end of said engine crankcase, a driving gear housed within said gear case and driven by said crankshaft, accessory drive mechanism driven by said crankshaft driving gear and substantially housed within said gear case, a plurality of accessory units comprising a generator and a starter supported by said gear case and operatively connected with said accessory drive mechanism, a reduction gear assembly including a casing offset with respect to the crankshaft and secured to the gear case and projecting forwardly of the engine substantially coaxial with respect to the center longitudinal axis of the engine, which axis is substantially equidistant from the outer extremities of the engine crankcase and cylinder heads, said accessory units supported forwardly of the gear case and positioned substantially within the axial projection of the segmental space lying intermediate the V-arranged engine cylinders and adjacent to said reduction gear casing, and other accessory assemblies supported by said gear case and operatively connected with said accessory drive mechanism, said other assemblies projecting rearwardly of said gear case into the space lying intermediate the V-arranged cylinders.

6. In a power transmission assembly for an aircraft engine comprising an engine of the V-type having a crankcase, a crankshaft and a plurality of aligned cylinders, a propeller shaft offset with respect to said crankshaft, a separate gear case secured to the forward end of said engine crankcase, a gear reduction assembly supported forwardly of said gear case and axially aligned with said propeller shaft, and gearing supported within said gear case comprising a crankshaft gear driven by said engine crankshaft, a propeller shaft driving gear drivingly connected with said crankshaft gear and supported by said gear case for rotation about an axis extending coaxial with respect to the center longitudinal axis of said engine, which axis is substantially equidistant from the outer extremities of the engine crankcase and cylinder heads, said propeller shaft driving gear support including a drive shaft operatively connected with and axially aligned with said gear reduction assembly, spaced bearing means carried by said gear case for supporting said drive shaft, and accessory drive means including a train of gears positioned in a common plane extending normal to the center longitudinal axis of the engine and intermediate said propeller shaft driving gear and one of said drive shaft bearings, said train of gears including a gear secured to said drive shaft.

7. In a power transmission assembly for an aircraft engine comprising an engine of the V-type having a crankcase, a crankshaft and a plurality of aligned cylinders, a propeller shaft offset with respect to said crankshaft, a separate gear case secured to the forward end of said engine crankcase, a gear reduction assembly supported forwardly of said gear case and axially aligned with said propeller shaft, and gearing supported within said gear case comprising a crankshaft gear driven by said engine crankshaft, a propeller shaft driving gear drivingly connected with said crankshaft gear and supported by said gear case for rotation about an axis extending coaxial with respect to the center longitudinal axis of said engine, which axis is substantially equidistant from the outer extremities of the engine crankcase and cylinder heads, said propeller shaft driving gear support including a drive shaft operatively connected with and axially aligned with said gear reduction assembly, spaced bearing means carried by said gear case for supporting said drive shaft, and accessory drive means including a train of gears positioned in a common plane extending normal to the center longitudinal axis of the engine and intermediate said propeller shaft driving gear and one of said drive shaft bearings, said drive shaft having external splines extending longitudinally thereof substantially between said spaced bearings, said propeller shaft driving gear and one of the gears of said gear train both having a splined driving connection with said splined drive shaft.

JAMES W. KINNUCAN.